(12) United States Patent  (10) Patent No.: US 7,844,514 B2
Blasnik et al.  (45) Date of Patent: Nov. 30, 2010

(54) TABLE DRIVEN ACCOUNTING METHOD AND SYSTEM

(75) Inventors: Steven L. Blasnik, Dallas, TX (US); Brian Kodl, Dallas, TX (US); Joe E. Walters, Garland, TX (US)

(73) Assignee: Perot Investments, Inc., Plano, TX (US)

( * ) Notice: Subject to any disclaimer, the term of this patent is extended or adjusted under 35 U.S.C. 154(b) by 1753 days.

(21) Appl. No.: 09/949,957

(22) Filed: Sep. 10, 2001

(65) Prior Publication Data

US 2003/0050877 A1   Mar. 13, 2003

(51) Int. Cl.
*G06Q 40/00*   (2006.01)
(52) U.S. Cl. .............................. 705/35; 705/36; 705/37
(58) Field of Classification Search ................... 705/35, 705/36, 37
See application file for complete search history.

(56) References Cited

U.S. PATENT DOCUMENTS

| | | | | |
|---|---|---|---|---|
| 4,566,066 | A | | 1/1986 | Towers ........................ 364/408 |
| 5,193,056 | A | | 3/1993 | Boes |
| 5,749,077 | A | | 5/1998 | Campbell ..................... 705/36 |
| 5,911,136 | A | | 6/1999 | Atkins .......................... 705/36 |
| 5,987,435 | A | | 11/1999 | Weiss et al. .................... 705/36 |
| 6,516,303 | B1 | * | 2/2003 | Wallman .................. 705/36 T |
| 6,968,317 | B1 | * | 11/2005 | Wallace et al. ............ 705/36 R |
| 7,165,044 | B1 | * | 1/2007 | Chaffee ........................ 705/37 |

OTHER PUBLICATIONS

PCT Written Opinion for International Application No. PCT/US02/28712, 4 pages, Mailing Jun. 17, 2004.*
PCT for International Search Report Application No. PCT/US02/28712, 4 pages, Mailing Apr. 18, 2005.
*European Patent Office; Summons to Attend Oral Proceedings* for Application No. 02761607.7-2221; 10 pages, Mar. 11, 2008.
*European Patent Office; Decision to Refuse a European Patent Application* for Application No. 02761607.7-2221; 4 pages, Nov. 6, 2008.

* cited by examiner

*Primary Examiner*—Nga B. Nguyen
(74) *Attorney, Agent, or Firm*—Baker Botts L.L.P.

(57) ABSTRACT

The described embodiments of the invention include a method for maintaining accounting records for a portfolio of investments, comprising accounting records stored on a computer readable medium and providing a table for each event type affecting an investment for generating an account entry, each line of the table designating which accounting record receives the account entry and at least one key designating a data source for the account entry and an operation on the data source to determine the amount of the account entry. In an alternate embodiment of the invention, a data processing system for maintaining accounting records for a portfolio of securities comprises a plurality of accounting records stored on a computer readable medium, the accounting records including tax accounts, a plurality of defined security types and, for each security type, a plurality of tables for each transaction affecting a security for generating an account entry, each line of the table designating which accounting record receives the account entry and a key designating a data source for the account entry and an operation on the data source to determine the amount of the account entry.

10 Claims, 19 Drawing Sheets

FIG. 4A

☐ View JE Template Lookup

Press Delete or DoubleClick to Hide Column

Transaction Types
63

| Instrument Class | Mark To Market | Open Ticket |
|---|---|---|
| Government Bills | None | GENOPEN |
| Foreign Govt Bills | None | GENOPEN |
| Cap/Floor | MTMBOND | GENOPEN |
| Currency Basis Swaps | MTMBOND | GENOPEN |
| CD | None | GENOPEN |
| Non-Taxable Commercial Paper | None | GENOPEN |
| Commercial Paper | MTMBOND | GENOPEN |
| Corporate Bonds | MTMBOND | FORBNDOP |
| Foreign Corporate Bonds | MTMBOND | FORBNDOP |
| Cash Account | None | None |
| ▲ Common Stock | MTM GENERAL | GENOPEN |
| Currency Forward | MTM FRWD | FRWDOPEN |
| Currency | None | None |
| Equity Swaps US | MTMBOND | GENOPEN |
| Foreign Equity Swaps | MTMBOND | GENOPEN |
| Future | MTM FUTURE | GENOPEN |
| FX Conversion | None | None |
| General Put/Call | None | None |
| Generic | None | None |
| General Asset Forward | None | None |

| 62 | 73 | 75 |
|---|---|---|
| General Liability | None | GENOPEN |
| General Loan | None | GENOPEN |
| US Government Bonds | MTMBOND | FORBNDOP |
| Foreign Government Bonds | MTMBOND | FORBNDOP |
| Inside Corporations | None | None |
| Index | None | None |
| Inside Partnerships | None | GENOPEN |
| Intangible Asset | None | GENOPEN |
| Not Defined Yet | None | None |

Reset Grid

Cancel

FIG. 5

☐ View Chart Of Accounts Lookup

Chart of Accounts Lookup Filter

| Instrument Class | Account Code | Account Type | Account Subcode | Short/Long |
|---|---|---|---|---|
| Common Stock | TAX | SECURITY | | LONG |
| ▲ Common Stock | GAAP | SECURITY | | LONG ▼ |
| * | | | | |

Search
Clear

Chart of Accounts Lookup Results

| Instrument Class | Account Code | Account Type | Account Subcode | Short/Long | Account Number | Sub Account |
|---|---|---|---|---|---|---|
| CSTK | GAAP | SECURITY | COST | LONG | 12410 | 110 |
| CSTK | GAAP | SECURITY | MARKET | LONG | 12410 | 410 |
| CSTK | TAX | SECURITY | COST | LONG | 12410 | 100 |
| ▲ CSTK | TAX | SECURITY | MARKET | LONG | 12410 | 400 |

4 Items Found

Cancel

FIG. 6

Table 64:

| Line | Acct Code (76) | Acct Type (78) | Account Sub Type (80) | Currency (92) | Original Ticket Type (94) | Completion |
|---|---|---|---|---|---|---|
| 1 | TAX | SECURITY | COST | INSTRMNT | TAXLOT | NONE |
| 2 | GAAP | SECURITY | MARKET | INSTRMNT | TAXLOT | NONE |
| 3 | GAAP | SECURITY | MARKET | INSTRMNT | TAXLOT | NONE |
| 4 | TAX | SECURITY | COST | INSTRMNT | TAXLOT | NONE |
| 5 | GAAP | SECURITY | MARKET | INSTRMNT | TAXLOT | NONE |
| 6 | GAAP | SECURITY | MARKET | INSTRMNT | TAXLOT | NONE |
| 7 | GAAP | GAINLOSS | MARKET | INSTRMNT | TAXLOT | NONE |

(90 spans columns 76 and 78)

Table 68:

| UNITS 96 | | | G/L 98 | | | BASE 100 | | |
|---|---|---|---|---|---|---|---|---|
| Amt Type | +/- | Line References | Amt Type | +/- | Line References | Amt Type | +/- | Line References |
| NONE | + | | REVLOT | + | | REVLOT | + | |
| NONE | + | | REVLOT | + | | REVLOT | + | |
| NONE | + | | MARKVAL | + | | ZERO | + | |
| NONE | + | | OFFSET | − | 1 | OFFSET | + | 1 |
| NONE | + | | OFFSET | + | 1,3 | CURRENT | − | |
| NONE | + | | OFFSET | + | 3 | ZERO | + | |
| NONE | + | | OFFSET | + | 2,5 | OFFSET | + | 2,5 |

FIG. 7  700

| | ACCT | SUB_ACCT | DESC | ROLLUP | CATEGORY BASIS | PRIN |
|---|---|---|---|---|---|---|
| 708 | 10000 | 000 | Assets | 1A | T | N |
| 706 | 12000 | 000 | Marketable Securities – Long | 2A | T | N |
| 704 | 12400 | 000 | Equity Securities | 3A | T | N |
| 702 | 12410 | 000 | Common Stock | 5A | T | N |
| | 12410 | 100 | Common Stock – Tax Basis | 6A | CT | Y |
| | 12410 | 109 | Common Stock – Tax Basis – FX Unrealized | 8A | MG | N |
| | 12410 | 110 | Common Stock – GAAP Basis | 6A | CG | Y |
| | 12410 | 119 | Common Stock – GAAP Basis – FX Unrealized | 8A | MG | N |
| | 12410 | 400 | Common Stock – Market Value Adjustment – Tax Basis | 6A | MT | N |
| | 12410 | 409 | Common Stock – Market Value Adjustment – Tax Basis – FX Unrealized | 8A | MG | N |
| | 12410 | 410 | Common Stock – Market Value Adjustment – GAAP Basis | 6A | MG | N |
| | 12410 | 419 | Common Stock – Market Value Adjustment – GAAP Basis – FX Unrealized | 8A | MG | N |

FIG. 8A(a)

☐ Ticket #11330 - Lehman Bros Holding Inc Common Stock - POSTED (View Mode)

Ticket General Information
☐ Delay Ticket Posting
Ticket Number [11330]    Trace Date [11/04/94]
Transaction [BUY0]       Settle Date [11/14/94]
                         Holding Date [11/04/94]

Instrument Information
Instrument ID [LEH]
Currency [USD]
Spot Rate [1.00]

Broker Information
Counter Party [DUM ▸]
Custodian [DUM.PETS ▸]
☐ Confirm With Counterparty

Commission Information
Currency [USD ▸]
Spot Rate [1.00]
Type [UNIT ▸]
Rate [0.00 ▸]

Trade Information
Portfolio [PETS]
Book [ELN ▸]
Position [16 ▸]
Trader [BRP ▸]
Responsible [BRP ▸]

Invoice Information
Price [16.125 ▸]
? [     ]
? [     ]
Forward Points
Other Cost [0.00 ▸]
Commission [0.00]
Invoice [(1,023,163.50)]

Yield Information
Yield [     ]
Discount [     ]
[Price/Yield]    [Accrued]

Account Information  Units [63,452.00]  Cash [1,023,163.50]

Units Account Information

| Account # | | Units |
|---|---|---|
| ▲ DUM.PETS | ▶ | 63,452.00 |
| * | | |

Units Allocated [63,452.00]

Cash Account Information

| Account # | | Cash |
|---|---|---|
| ▲ DUM.PETS | ▶ | 1,023,163.50 |
| * | | |

Cash Allocated [1,023,163.50]

Ticket Notes

[Instrument]  [GL]  [Related Tickets]  [Cancel]

☐ Auto Inventory Allocation

| Ticket Number | TEST | | Price | | 30.00 | Trade Date | 03/27/2000 |
| Instrument ID | COC | | Portfolio | PETS | | Settle Date | 03/30/2000 |
| Units | | (1,000.00) | Book | ERB | | Holding Date | 03/27/2000 |
| Transaction Type | SELC | | Position | 104 | | | |
| CONOCO INC CL A | | | | | | | |

| * | Orig Ticket | Book | Position | Account | Holding Date | Basis | Tax Benefit | | | |
|---|---|---|---|---|---|---|---|---|---|---|
| ▲ | 37358.1 | ERB | 104 | DEU.20600240 | 07/14/1999 | 27.30 | (0.2533) | $1,000.00 | 50,000.00 | 0.00 |
| | 37376 | ERB | 104 | DEU.20600240 | 07/16/1999 | 27.05 | (0.2741) | 0.00 | 50,000.00 | 0.00 |
| | 37395 | ERB | 104 | DEU.20600240 | 07/20/1999 | 26.1125 | (0.354) | | 25,000.00 | |

Inventory Auto Allocation ☐ Automatically Recalculate?

EXPECTING HOLDING USED [ 6 ] DEFAULT DISCOUNT RATE USED [ 5.00% ] [ 0.00 ] [ 1,000.00 ]

[ RESET ] [ RECALC ] [ SHOW ALL BOOKS POSITION ]

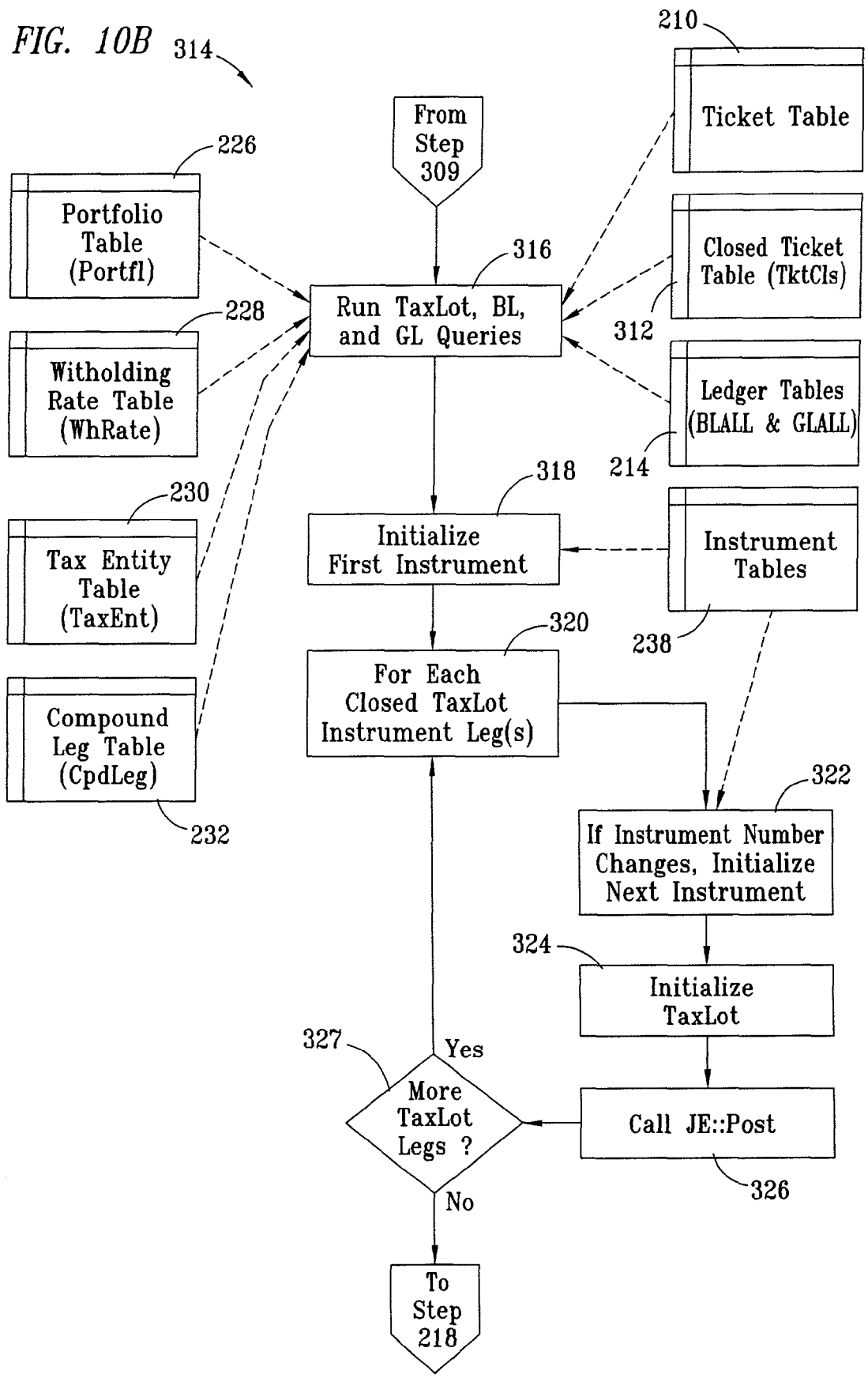

TABLE DRIVEN ACCOUNTING METHOD AND SYSTEM

TECHNICAL FIELD

The present invention relates to the field of accounting methods and systems and, more specifically, to the field of accounting methods and systems for investments.

BACKGROUND

Investment portfolio accounting systems are systems that store, account for, and report on portfolios of investment assets and liabilities. A portfolio accounting system must track each transaction or other event that affects the value, income, or tax consequences of investments. Portfolio accounting systems are distinguished from portfolio management systems in that every accounting consequence is tracked. In portfolio management systems, the focus is on investment performance and security positions. Some accounting information is generated coincidentally with performance tracking. However, in general, this information must be supplemented by the work of accountants to meet accounting requirements.

Creating and maintaining a portfolio accounting system is more difficult in many ways than ordinary business accounting systems. Large investment portfolios can have many thousands of transactions per day. Each purchase or sale of a security has tax consequences that must be tracked. The "inventory" of securities can experience a number of predictable and unpredictable events, such as dividends, interest coupons, splits, exchanges, defaults, calls, puts, amortization, accretion, and the like. The investment community is constantly inventing new kinds of securities with new kinds of events. Examples of recently developed investment vehicles include collateralized mortgage bonds, dual currency bonds, swaps, forwards, amortizing swaps, and contingent value rights. Tax and accounting rules often change, particularly with new types of investments.

Prior portfolio accounting systems include specific program subroutines to handle each type of security and each type of transaction. By the time these programs are written, they are often obsolete. They also commit their users to particular accounting policies when the rules may be subject to differing interpretations. Any change to these programs involves the intervention of computer professionals. This usually involves a large time and expense outlay.

Therefore, what is needed is a portfolio accounting system and method which is readily adaptable to changing circumstances, and that is easily adaptable by accounting professionals without assistance from programming professionals.

BRIEF SUMMARY OF THE INVENTION

The present invention, accordingly, provides a method for maintaining accounting records for a portfolio of investments, including a table for each event type affecting an investment for generating an account entry. Each line of the table designates which account receives an account entry, and at least one key designates a data source for the account entry, and an operation on a data source determines the amount of the account entry.

In an additional embodiment of the invention, a data processing system for maintaining accounting records for a portfolio of securities includes a plurality of accounts, such as tax accounts, a plurality of defined security types and, for each security type, a plurality of tables for each transaction affecting a security for generating an account entry. Each line of each table designates which account receives the account entry, a key designates a data source for the account entry, and an operation on the data source determines the amount of the account entry.

BRIEF DESCRIPTION OF THE DRAWINGS

For a more complete understanding of the present invention and the advantages thereof, reference should be made to the following Detailed Description taken in connection with the accompanying drawings in which:

FIGS. 4A and 4B is a screen shot showing the template look-up page of the preferred embodiment;

FIG. 5 is a screen shot showing the designation of a group of accounts as defined in the preferred embodiment;

FIG. 6 is a chart showing the table definition of an example template;

FIG. 7 is a printout showing the hierarchical nature of the account structure of the preferred embodiment;

FIG. 8A is an example of a ticket data entry form;

FIG. 8B is an example of a closing ticket inventory allocation screen;

FIGS. 10A and 10B are process flow diagrams for a closing (sell long/buy short) ticket in the system of the preferred embodiment;

DETAILED DESCRIPTION OF THE PREFERRED EMBODIMENT

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning principles of accounting and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, or integrated circuits that are coded to perform such functions.

Figure 1:
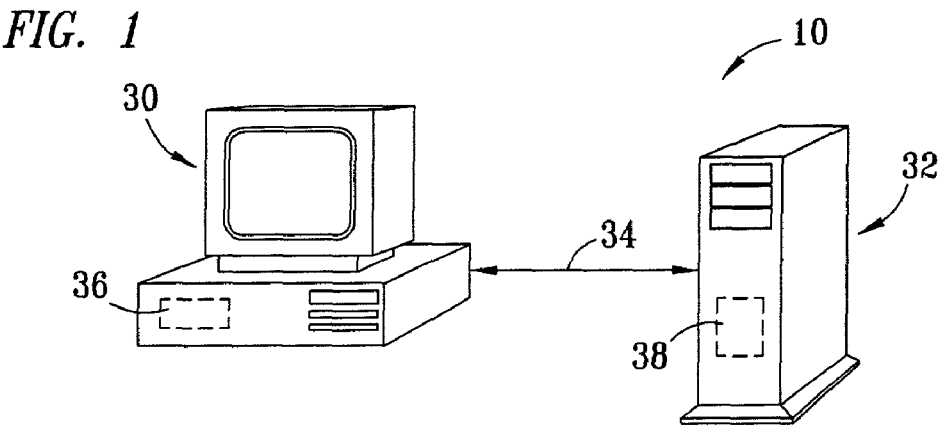
FIG. 1 is a schematic diagram representing a relationship of computing systems useful for operating a preferred embodiment of the present invention.

Referring to FIG. 1 of the drawings, the reference numeral 10 generally designates a representative client/server system of a networked environment embodying features of the present invention. The system 10 includes a client machine 30 connected to a server platform 32 via a communication channel 34 comprising a network connection, such as an Ethernet based network, or the like.

The machine 30 may be exemplified by an electronic data processor or a personal computer powered by a microprocessor (not shown) such as an Intel® x86, PowerPC® or a RISC type processor, effective for executing software components 36.

The server platform 32 is one of, preferably, a plurality of servers, which are accessible by clients, one of which is illustrated by the machine 30, and is effective for executing software components 38 and providing data warehousing for the system 10. The server 32 preferably comprises a PC server type machine, such as a Dell™ PowerEdge™ 6300, or, alternatively, for large-scale installations, may comprise a high-capacity server platform 32, such as a Sun Microsystems Netra ft 1800® computer.

Figure 2:
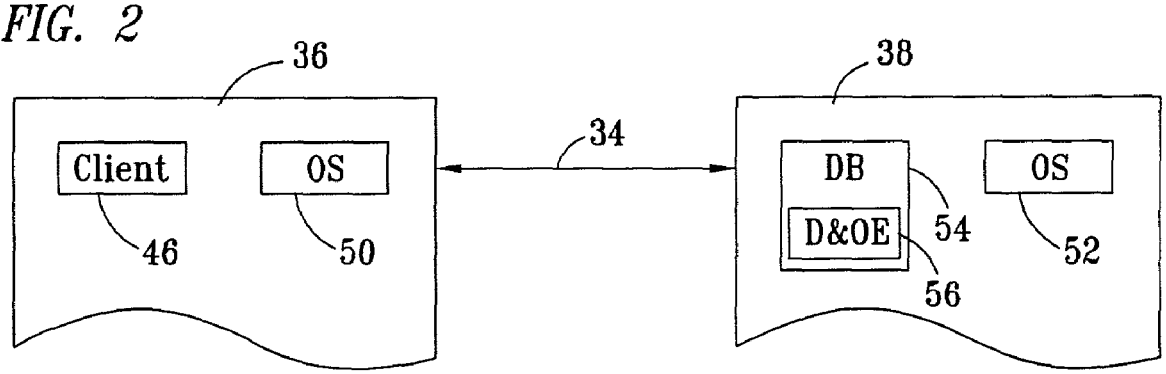
FIG. 2 is a diagram identifying operating components of the systems of FIG. 1.

FIG. 2 is a block diagram representing software components 36 and 38 operating on the machine 30 and the server platform 32, respectively. The software components 36 include an operating system (OS) 50, such as IBM® OS/2®, Microsoft Windows® 98, or Microsoft Windows® NT®, Microsoft Windows® 2000, or the like, and client software 46 operable for accessing, via the communication channel 34, the network server 32, and the network environment generally.

The software components 38 for the server 32 preferably include an operating system (OS) 52, such as Microsoft® Windows® 2000, which includes built-in support for networking. For large-scale installations, using a high-capacity server platform, such as the Sun Microsystems Netra ft 1800® computer, an OS 52 such the Sun Solaris® Operating System, may be preferred. The server 32 also includes a database (DB) engine 54, such as Oracle® 8I, having data and operational elements 56 (discussed below), and which may be accessed using a conventional browser.

Figure 3:
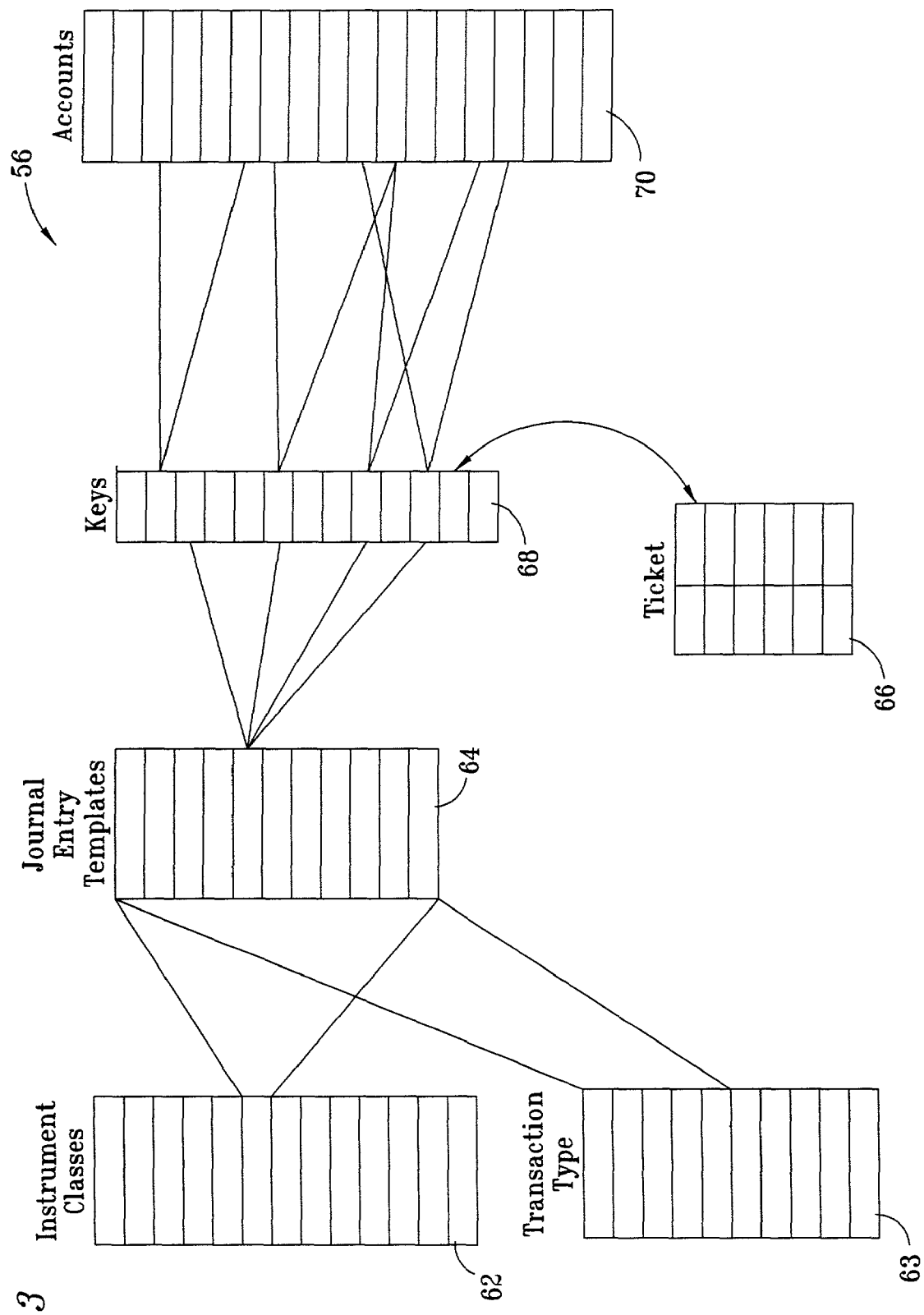
FIG. 3 is a relationship diagram showing the relationship between conceptual components of the preferred embodiment.

FIG. 3 is a chart showing a hierarchical relationship of the data and operational elements 56 of a preferred embodiment of the present invention. Types of investments are grouped as instrument classes 62 of investments. Generally, the classes 62 comprise securities, such as stocks, bonds, futures, debt instruments, options, and the like. For each security class, a series of journal entry (JE) templates 64 is provided. Every journal entry template 64 is uniquely identified by matching a transaction type 63 with the instrument class 62. As described below, the templates 64 include a set of predefined account look-ups and function keys 68. Resolution of its look-ups and calculation of its keys results in a complete journal entry.

The keys 68 are predefined operational activities. The keys 68 define operations on data taken from a ticket (which is used to enter data into the accounting system as discussed below with respect to FIG. 8A), outside data source, or existing ledger balances within a TaxLot (described below). The keys 68 generally perform a mathematical operation on the data. The result of the mathematical operation is added to (debited) or subtracted from (credited) an account 70 associated with the key 68 as defined in the template 64. Of importance, the keys 68 are a relatively fixed list of mathematical manipulations, which accountants may select for operations in any template 64.

The mathematical operations defined in the keys 68 are selected to be as comprehensive as possible to minimize the need for professional computing support to define new keys. The classes 62, templates 64, and accounts 70 may be readily modified by accounting professionals to match the needs of the accounting system. Commonly used facilities, such as dialog boxes and internal consistency checks, are provided to enable non-professional programmers to enter this information while maintaining the integrity of the database 54 underlying the portfolio accounting system. These facilities for entering new classes, templates, or accounts are provided using commonly available database management tools. Generally, most database packages include facilities for accomplishing these tasks. Even if not included, such facilities are within the purview of those skilled in the art.

FIGS. 4A and 4B depict a screen shot 71 of the dialog for selecting templates 64 in accordance with a preferred embodiment of the present invention. The screen shot 71 includes a column of Instrument Classes 62, and a row of transaction types 63. The Instrument Classes 62 comprises a number of different types of investments, such as government bills, common stock, currency forwards, and the like. Each Instrument Class 62 may be affected by any number of given transaction types 63. The transaction types 63 include a column 73 for the "Mark to Market" transaction 72, and a column 75 for the "Open Ticket" (i.e., the opening of a new security position) transaction 74. Other transaction types 63 (not shown) may include Close Ticket transaction, Mature transaction, Receive Income transaction, Receive Principal transaction, Contribute/Distribute transaction, Accrue Income transaction, and the like. The dialog of the screen shot 71 provides for the assignment of a specific Journal Entry Template 64 (FIG. 6) to a given combination of Instrument Class 62 and Transaction Type 63. The column 72 displays the Mark to Market Transaction Type 63. The Mark to Market Transaction, along with the assigned template 64, updates the market value of securities based on current valuation given to it by the template key 68 (FIG. 3). The next example (FIG. 4A regarding the open transaction) will assign a specific template 64 used for the open ticket 74 (column 75) transaction type 63. The combination of the open ticket 74 transaction type 63 (FIG. 3) with any instrument class 62 results in the assignment of the appropriate template 64. The Transaction Type 63 records the Opening of a new position and may be long or short, and creates what is referred to herein as a new "TaxLot," described further below.

FIG. 5 depicts a screen shot 75 showing a look-up facility for accounts 70 appearing in the journal entry templates 64. The look-up facility depicts a chart of Accounts Lookup Filter 77, which includes a Search Button 79 and a Clear button 81. The Search Button 79 is configured, so that, when activated (i.e., clicked), a procedure is executed for identifying all accounts 70 which meet the criteria specified in the Filter 77, and for displaying such accounts in a Chart of Accounts Lookup Results 83, discussed further below. The Clear Button 81 is configured, so that, when activated (i.e., clicked), the Filter 77 is cleared of all criteria entered, and the Chart of Accounts Lookup Results 83 is cleared of all results generated.

As discussed above with respect to FIG. 3, in a preferred embodiment of the invention, each account 70 is defined in a hierarchical manner. With further reference to FIG. 5, the accounts 70 are categorized initially by instrument classes 62; as exemplified in FIG. 5, the instrument classes 62 are common stock (CSTK). A secondary category is the Account Code 76, by which accounts are categorized between those used in accordance with Generally Accepted Accounting Principles (GAAP), and those used in accordance with tax accounting (TAX). GAAP accounting principles are those promulgated by the Financial Accounting Standards Board for financial accounting. Tax accounts are those required for meeting taxation requirements. In the United States, tax accounts are generally defined in conformance with the rules of the Internal Revenue Service. It is understood that, where appropriate, taxation accounts may be formed for taxes levied by other taxing authorities such as other countries or states.

The Account Code 76 may also define any number of other accounting regimes simultaneously in place of or in addition to GAAP and TAX exemplified in the current embodiment. One such possibility is statutory accounting used in the insurance industry.

The accounts are further categorized by the Account Type 78. As exemplified in FIG. 5, all accounts 70 are related to securities, though they may be related to other account types 78 (not shown), such as, for example, cash, debt, income, expense, gain/loss, and the like. The accounts 70 are further categorized by Account Subcode 80. In the example, the Account Subcodes 80 are COST and MARKET. COST accounts are used to track the actual cash flows (as opposed to unrealized valuations) and determine cost basis of investments. MARKET accounts are used for determining the current valuation of a position. The accounts 70 are further categorized into SHORT/LONG positions 82. A SHORT position represents the sale of borrowed securities that are subsequently purchased with the anticipation that the price will be less than the earlier sale price. LONG positions represent a current purchase of the security, and are entered into with the intention that the value of the purchases security will increase over time. The five hierarchical categories 62, 76, 78, 80, and 82 resolve to a single ledger account/sub-account combination 70. FIG. 6 is a table showing the structure of an example journal entry template 64. A list of account look-up codes 90 is provided on lines 1-7. Each account is looked up, as shown in FIG. 5, by accounting class 62, account code 76, account type 78, account sub-code 80, and SHORT/LONG status 82. The TaxLot knows its own status as a LONG position ("buy open") or SHORT position ("sell open"), and is exemplified as an OPEN TICKET in FIG. 8A. A source (key) for the currency type 92 is indicated. The currency type 92 has its own set of keys to be resolved. These (the currency keys) can include: the instrument, base, fees, and the like. For lines 1-7 exemplified in FIG. 6, the currency source is provided by the definition of the instrument. The Original Ticket Type 94 column indicates the origin of the data to be operated on. For all lines in FIG. 6, the source and destination of the data is the existing TaxLot.

A TaxLot results from an open ticket transaction. A new TaxLot is created for a particular class of securities when that security is bought long or sold short. In a transaction involving a new open ticket, the Original Ticket Type 94 would be "ticket". That would indicate that the transaction performed by the template would be operating on data from a new open ticket. Separate ledger entries 600 (FIG. 12B) are kept for securities units 96, native currency 98, and base currency 100 (e.g. U.S. dollars). In a mark-to-market transaction, the units do not change. Thus, the keys 68 ("Amt Type") entered for the units account 96 are set to "none".

In the current example, the keys 68 used on the General Ledger (G/L) accounts, in the amount field, are the reverse lot (REVLOT) key, the market value (MARKVAL) key, and the offset (OFFSET) key. When the template 64 is executed by the transaction engine (i.e., the method described below with respect to FIGS. 9A-12B), these keys 68 perform their assigned tasks, as discussed below with respect to step 610 of FIG. 12A. With the RevLot key, the total value of the subject account, for the associated TaxLot and currency, is multiplied by negative one (i.e., the negative of the balance is added to the account). Thus, the negative of the account value is retrieved and the account value is zeroed. Reverse lot entries are entered for the accounts designated on lines 1 and 2 of FIG. 6. Data are re-entered for these accounts in lines 3 through 6. On line 3, the market value is derived from an external source and added to the GAAP:SECURITY:MARKET account. Generally, the market price data is provided by a commercial service, and the value is calculated based on such price.

The OFFSET key uses data previously applied in a template and reverses it (i.e., multiplies it by negative one; note that the REVLOT key retrieves balances from the ledger, while the Offset key retrieves a number already in the template). The OFFSET key is a commonly used key because, for each positive entry (debit), proper accounting practice requires an opposing negative entry (credit). If more than one line is retrieved by an OFFSET key, then those values are added together. In the example of FIG. 6, the amount (i.e., the amount retrieved via action performed by the key) of line 1 provided in the REVLOT key is offset and entered into the account of line 4, which is the same account as in line 1. Thus, the amount in TAX:SECURITY:COST is subtracted and added back again. The purpose of utilizing the REVLOT and OFFSET keys 68 in this manner is to bring the balance of the TaxLot into the template 64 without changing the balance in the General Ledger; e.g., the amounts from line 1 and line 4 net to zero for this respective account.

In line 5, the amount of line 3 (market value) is added to the amount of line 1 (negative of security cost) and the negative of that sum is added to the account of line 5. The sum of lines 1 and 3 is added, rather than subtracted, in response to the negative sign in the +/− column. Thus, the delta between the market value (line 3) and the security cost (line 1) is added to GAAP:SECURITY:MARKET (line 5). In line 6, the amount of line 3 is offset and entered into the account of line 6. This offsets the MARKVAL entry of line 3 so that the remaining amount in GAAP:SECURITY:MARKET is the difference between the market value and the cost. Also, the amount of line 5 (current delta over market) is added to the amount of line 2 (negative of prior delta over market) and entered into account of line 7. GAAP:GAINLOSS:MARKET is an offsetting account to GAAP:SECURITY:MARKET.

As can be seen from the chart below, the mathematical operations of the keys 68 are easily grasped. A properly defined set of keys allows the entry of any accounting activity occurring to a security account. A listing of keys available in the described embodiment is shown below. In addition, complete double entry may be accomplished for each transaction using the appropriate template. Of importance, no particular programming skill is required to establish templates and accounts. Only knowledge of the effect of the keys is necessary. Accordingly, the present embodiment provides an accounting system of complete flexibility in portfolio accounting that non-computer professionals can establish and maintain.

| Units, GL, Base | Keyname | Line ref. | Definition | Transaction |
|---|---|---|---|---|
| UNITS | T0LDUNIT | N | Total Ticket units from the close ticket (prior ticket) | Transaction via Conversion Wizard |
| GL | UNITS | 1 | Return the amount in line i from the Units column | JE |
| GL, BASE | UNTAMT | 2 | (Units on line i/TaxLot units) * line j | Transaction via TaxLot |

-continued

| Units, GL, Base | Keyname | Line ref. | Definition | Transaction |
|---|---|---|---|---|
| GL | WHAMT | Y | (Sum amount on line i, j, k, l-z) * w/h rate | Transaction via TaxLot |
| GL | WHNOTPD | 1 | Amount from line i * (1/w/h rate) | Transaction via TaxLot |
| GL, BASE | ZERO | N | Place zero value | JE |
| GL, BASE | OPEN | 2 | If the sign of line i = sign of line j, THEN line i * −1, ELSE If the absolute value of line I < absolute value Line j, THEN zero, ELSE −1 * sum (i, j) | JE |
| UNITS, GL | PDWNAMT | N | Amount of repo pay down | Transaction via TaxLot |
| UNITS, GL, BASE | POSITIVE | Y | If sum (i, j, k, l-z) > 0, THEN sum (i, j, k, l-z), ELSE 0 | JE |
| UNITS, GL, BASE | PRPTN | 3 | line j/k * amount on line i | JE |
| GL, BASE | RECALL | N | Recall the amount stored for the current lines lookup codes | JE |
| BASE | REVAMT | 2 | {Sum of current lines Lookup * [MIN (ABS(I)/ABS(j) OR 1]} −1 | JE |
| UNITS, GL, BASE | REVLOT | N | Sum of current lines lookup * −1 | |
| UNITS, GL, BASE | REVLOTAC | N | Sum of current lines lookup regardless of currency * −1 | |
| GL, BASE | REVPART | 1 | (Units from line i/TaxLot Units) * −1 | |
| BASE | RLVCASH | 2 | If sign of line i = sign of line j, THEN 0, ELSE {(base line i/GL line i) − (base line j/GL line j)} * MIN (abs val of GL line j, abs val of GL line j) * −1 | JE |
| BASE | RTAPPLY | 2 | (base line j/base line i) * GL line i − base line i | JE |
| BASE | RTDIFFNC | Y | {(Sum GL lines i, j, k, l-z) * current rate} − Sum Base lines i, j, k, l-z | JE |
| BASE | RTPRIOR | 1 | GL current line * (Base line i/GL line i) | JE |
| GL, BASE | STORE | 1 | Store the current amount in the temp registers | JE |
| GL | STRKVAL | N | Units * strike price given | Transaction via Conversion Wizard |
| GL | TCOM | N | From the commissions line on ticket (in commission currency) | Transaction via Ticket Wizard |
| GL | TCOMCONV | N | From the commissions line on ticket (converted to transaction to transaction currently) | Transaction via Ticket Wizard |
| GL, BASE | THRUZERO | 2 | If sign line i = sign line j, THEN 0, ELSE If abs val line i < abs val line j THEN 0, ELSE offset line i and line j * −1 | JE |
| GL | TKTAIPD | N | From the accrued interest paid line on ticket | Transaction via Ticket Wizard |
| UNITS, GL | TKTAMT | N | From the total invoice line on ticket | Transaction via Ticket Wizard |
| GL | TKTMARK | N | Calculate mark based on ticket total price * Units begin closed (do this for each TaxLot being closed and sum) | Transaction via Ticket Wizard |
| GL | TKTOTHER | N | From the other cost line on ticket | Transaction via Ticket Wizard |
| UNITS, GL | TKTUNITS | N | From the Units line on ticket | Transaction via Ticket Wizard |
| GL | BASE | 1 | Return the number in base on line i | JE |
| GL | CNVRTVAL | N | Return amount stored as Conversion Value | Transaction via Wizard |
| UNITS | CONVUNIT | N | Return amount stored as Conversion Units | Transaction via Wizard |
| BASE | CURRENT | N | Amount in GL * current FX Rate | JE |
| UNITS, GL, BASE | DIFF | 2 | Line i-Line j | JE |
| BASE | FRWDSPOT | N | NOT currently Used | N/A |
| UNITS, GL, BASE | IFZERO | Y | If line i is = zero then offset line j, k, l-z | JE |
| GL | INVCURR | 1 | Base amount line i/current rate for current line currency | JE |
| GL, BASE | NONE | N | Return Zero | JE |
| UNITS, GL, BASE | NOTZERO | Y | If line i < > zero, THEN offset line j, k, l-z, ELSE 0 | JE |
| UNITS, GL, BASE | OFFSET | Y | −1 * (sum i, j, k, l-z) | JE |

FIG. 7 is a chart showing an hierarchical structure 700 of accounts. The account exemplified is a Common Stock-Market Value Adjustant-GAAP Basis account, which is depicted as a sub-account of Common Stock (line 702), which is a sub-account of Equity Securities (line 704), which is a sub-account of Marketable Securities-Long (line 706), which is a sub-account of Assets (line 708). Organizing the accounts hierarchically is the preferred embodiment because it simplifies account and template management. However, this type of account structure is not necessary to achieve the benefits of the invention. Nor is it necessary to group templates by class.

FIG. 8A exemplifies a ticket entry form. A ticket is the primary method for entering trade data into the accounting system of the present invention. The data provided on the ticket form comprises one record in a ticket table (discussed below). Every ticket is given a unique number. FIG. 8B exemplifies an inventory allocation screen, wherein the inventory comprises open tickets (i.e., tickets with open inventory).

Figure 9A:
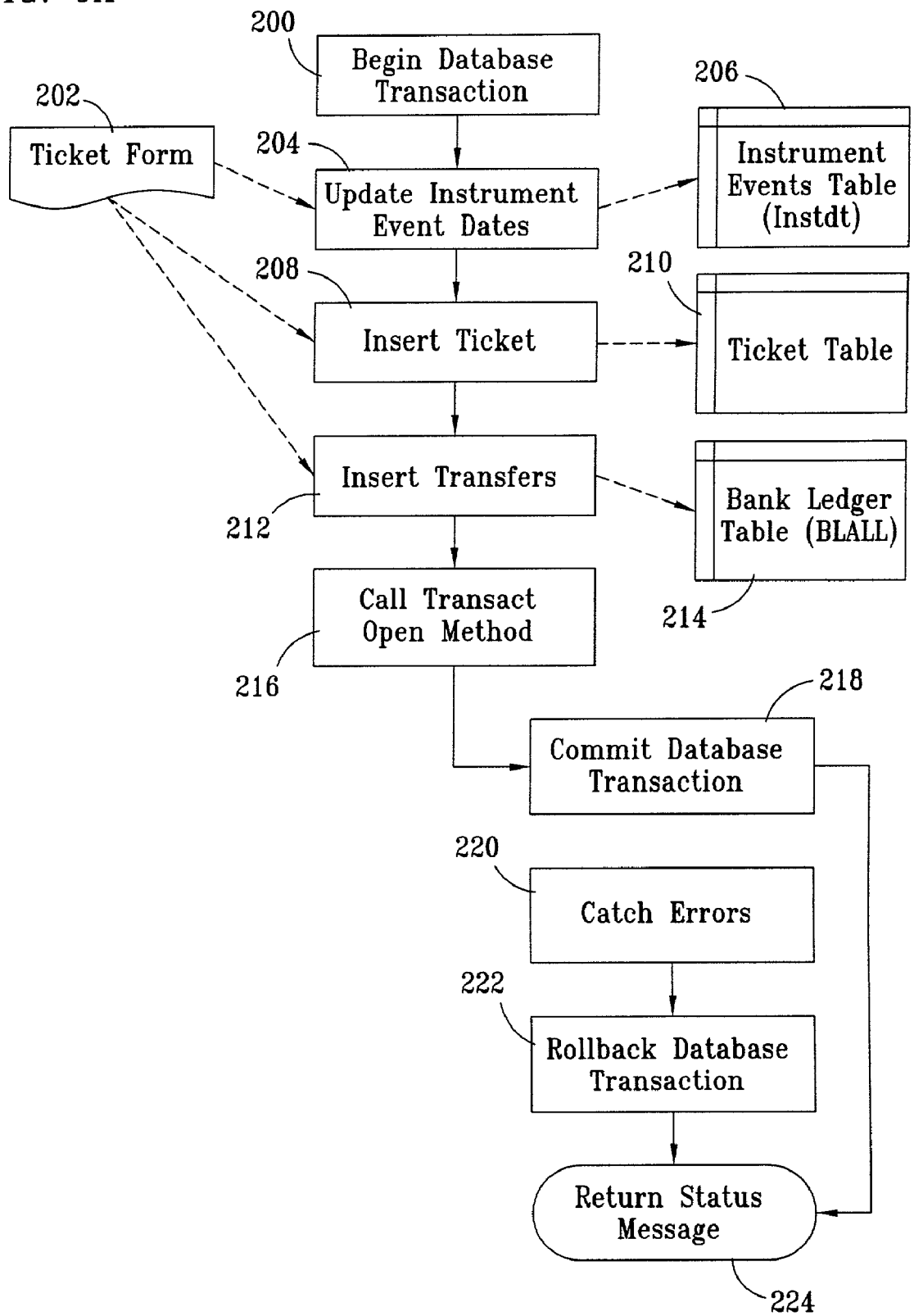
FIGS. 9A and 9B are process flow diagrams showing a method for entering an open (buy long/sell short) ticket into the system of the preferred embodiment.

FIG. 9A is a process flow diagram showing the processing of a transaction including data from an open ticket entered via a ticket form. In step 200, the transaction in the database 54 (FIG. 1) is initialized by the system and, in step 202, data is entered via a Ticket Form (FIG. 8A). The instrument event dates are updated at step 204 by entering the dates, entered via the ticket form in step 202, into an Instrument Events Table 206. The Ticket is inserted into a Ticket Table 210 at step 208. Transfers of funds and/or units are inserted into a Bank Ledger Table 214 at step 212. The Transaction Open Method is called (i.e., initiated) at step 216 (discussed further below with respect to FIG. 9B) and, at step 218, the database transaction is committed (i.e., table records are actually added, thereby updating the GL).

In addition, parallel systems for catching errors are executed at steps 220 and 222. These types of error traps are considered to be widely known in the art of programming and, therefore, will not be elaborated upon here. After the transaction has been committed to the database 54, a status message is returned at step 224 indicating that the commitment has occurred.

Figure 9B:
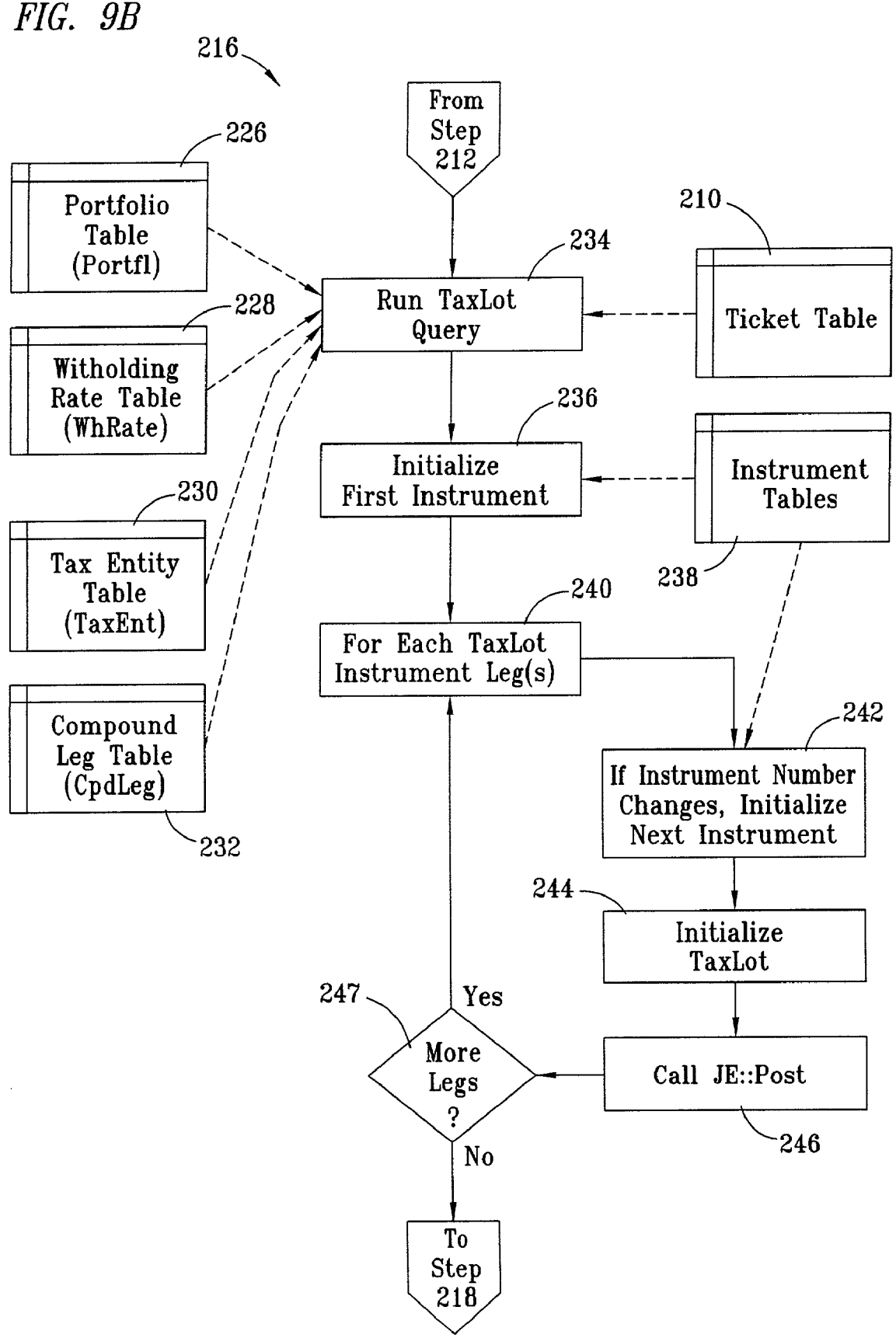

FIG. 9B is a flow diagram showing the details of step 216 (FIG. 9A). Data in a Portfolio Table 226, a Withholding Rate Table 228, a Tax Entity Table 230, and a Compound Leg Table 232 may include information required to resolve (i.e., calculate) accounting keys 68. Such information, includes portfolio base currency, foreign tax withholding rates, and instrument swap legs, and the like. Upon completion of step 212 (FIG. 9A), the information from the tables 226, 228, 230, and 232 is brought into the process by initiating, in step 234, a TaxLot Query, which reads the appropriate tables (FIG. 9A) for the opening ticket TaxLot. Next, the first A instrument is initialized at step 236 and the instrument characteristics are determined from Instrument Tables 238. Then, for each instrument and instrument leg of the TaxLot, the next instrument object is initialized at step 242, a TaxLot object is initialized at step 244 from the TaxLot Query (step 234) recordset, and posted in step 246 to the ledgers. Step 246 is described in further detail below with respect to FIGS. 12A and 12B. Upon completion of step 246, the process goes to step 247 in which a determination is made whether there are more legs. If it is determined that there are more legs, then the process returns to step 240; otherwise, the process returns to step 218 (FIG. 9A).

Figure 10A:
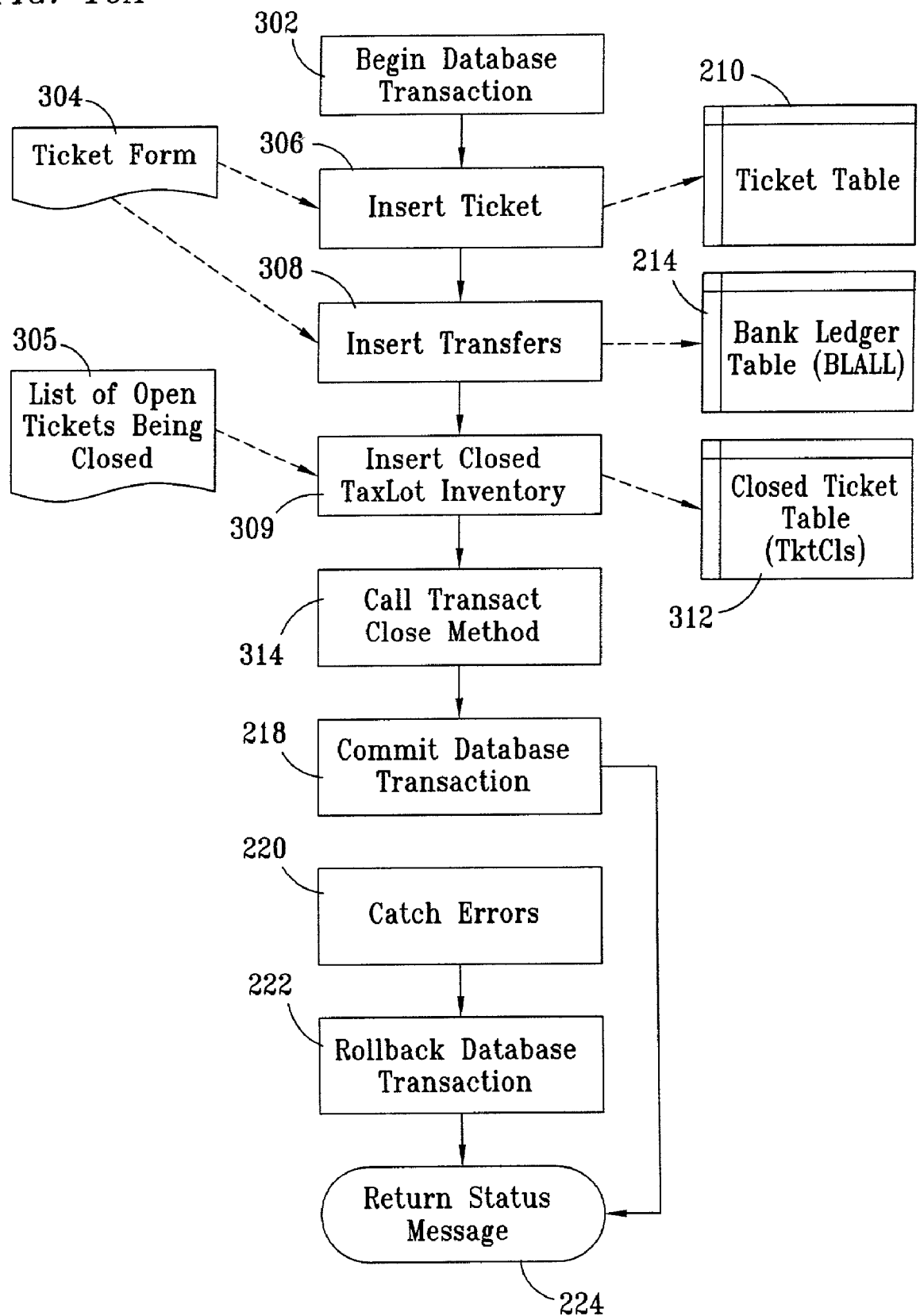

Two types of ticket-based transactions may occur: an open ticket or a closing ticket. As discussed above with respect to FIGS. 9A and 9B, an open ticket is used when a position is assumed, such as the purchase of stock or short sale of a security. The process for handling closing tickets is shown in FIGS. 10A and 10B. Accordingly, the system begins the database transaction at step 302. Closing ticket information comes from several forms 304, 305. The closing ticket is entered on form 304, similar to FIG. 8A. Form 305, shown in FIG. 8B, matches the appropriate open ticket(s) with the closing ticket, depending upon the calculated tax benefit. The user may override this match. Information from form 304 is inserted at step 306 into the ticket table 210 and/or, if the information involves a transfer, inserted at step 308 into the bank ledger table 214. Information from form 305 is inserted at step 309 into the closed ticket table 312, which keeps track of what ticket closed what TaxLot (open ticket). Then, step 314 posts a journal entry for each TaxLot being closed or partially closed, as described in further detail in FIG. 10B below. In step 218, the transactions are committed to the database 54 and, in steps 220-224, error trapping is again performed, as discussed above with respect to FIG. 9A.

Figure 12A:
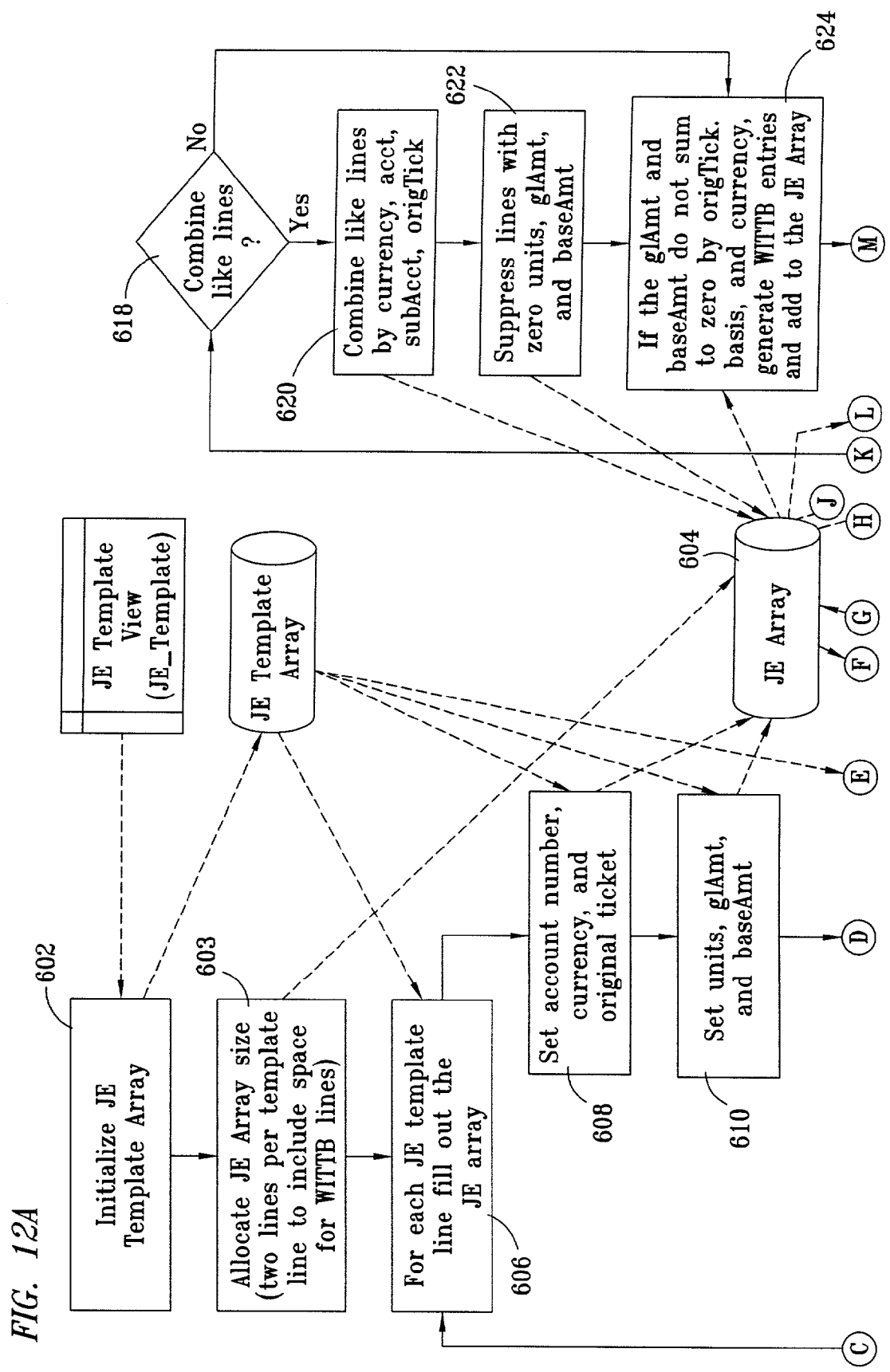
FIGS. 12A and 12B is a chart and flowchart showing the operation of the general ledger posting and bank ledger posting systems used in the preferred embodiment.
Figure 12B:
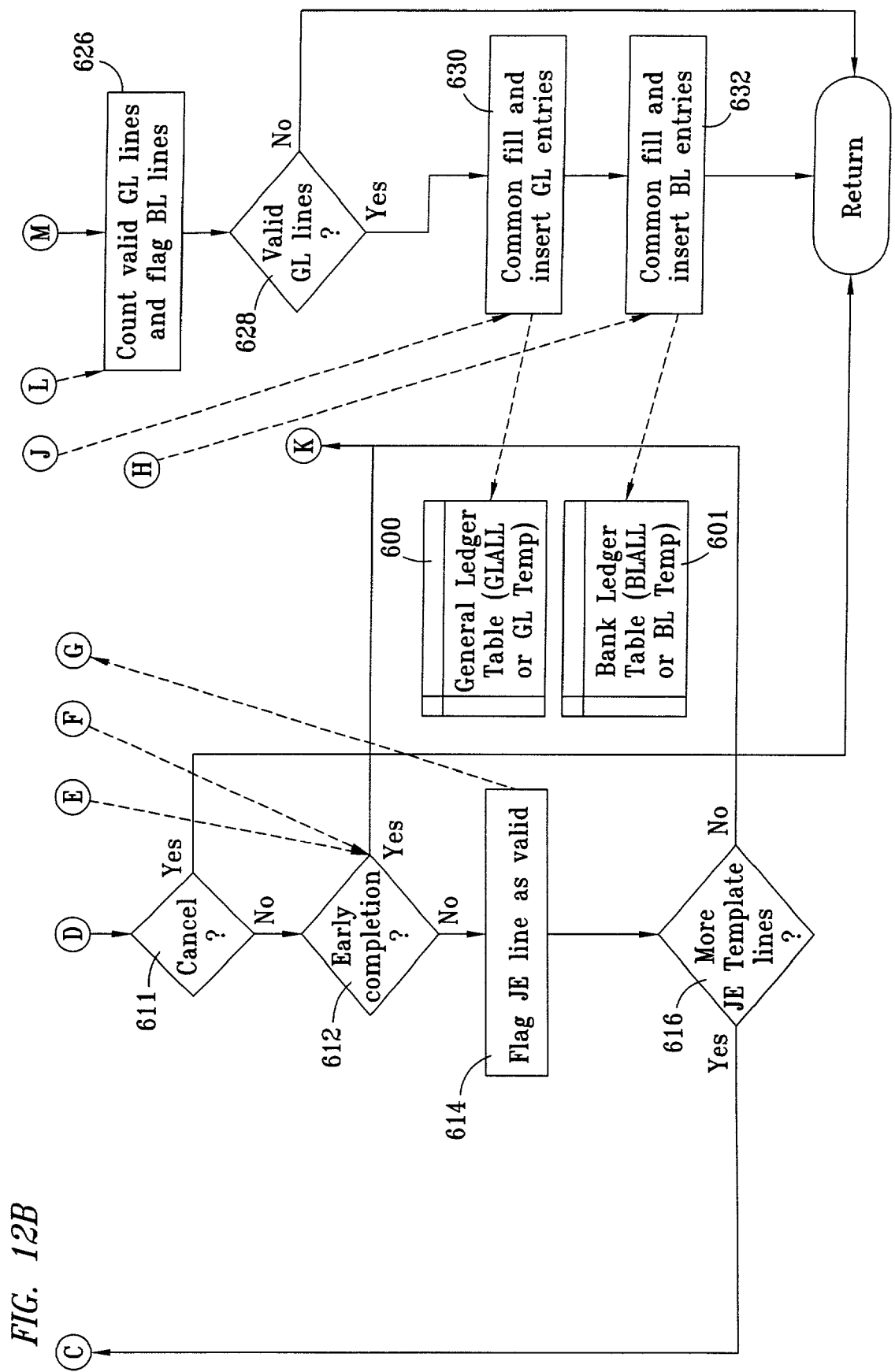

FIG. 10B is a flow diagram showing details of step 314. Closing information is brought into the process by initiating a TaxLot Query at step 316, which reads the appropriate tables for the closing ticket TaxLot(s), and then stores the read TaxLot in a TaxLot Query recordset. Next, the first instrument is initialized at step 318 and the instrument characteristics are determined from Instrument Table 238. Then, for each instrument and instrument leg of the closing TaxLot(s), the next instrument object is initialized at step 322, a TaxLot object is initialized at step 324 from the TaxLot Query recordset generated at step 316, and posted at step 326 to the GLALL and BLALL ledgers 600, 601. FIGS. 12A and 12B further outline step 326. Upon completion of step 326, the process goes to step 327 in which a determination is made whether there are more legs. If it is determined that there are more legs, then the process returns to step 320; otherwise, the process returns to step 218 (FIG. 10A).

In any accounting system, there are a large number of housekeeping functions that must be performed on a regular basis in order to keep the accounts current. In a preferred embodiment of the present invention, these transactions are summarized by the process of FIG. 11A. This process is preferably conducted at a regular time, such as at night when processing time is not at a premium, and preferably on a daily basis. In step 402, active transactions are read from a transaction table 405 (i.e., a table with a list of transaction types) and system task status is determined from a task table 403 (i.e., a table that keeps track of what transaction is to be performed and when). In step 404, the process gains exclusive control, thereby precluding anyone from modifying the tables. A loop then begins at step 406 where each transaction is executed at step 408 via one of transactions 407 or processes 409 (which processes do not generally create ledger entries). When all transactions have been processed, exclusive control is released in step 410; and successful status of the task completion is recorded in task table 403. In step 412, reports are generated to create records of the task activity completed in step 410 and, in step 413, the process is terminated. Step 414 runs in parallel with steps 402-412 to trap any errors that occur during those steps. In step 416, an unsuccessful status of the task completion is recorded. Step 418 communicates the error up to the support staff to allow them to determine the affect of the error and take corrective action, if necessary.

Figure 11A:
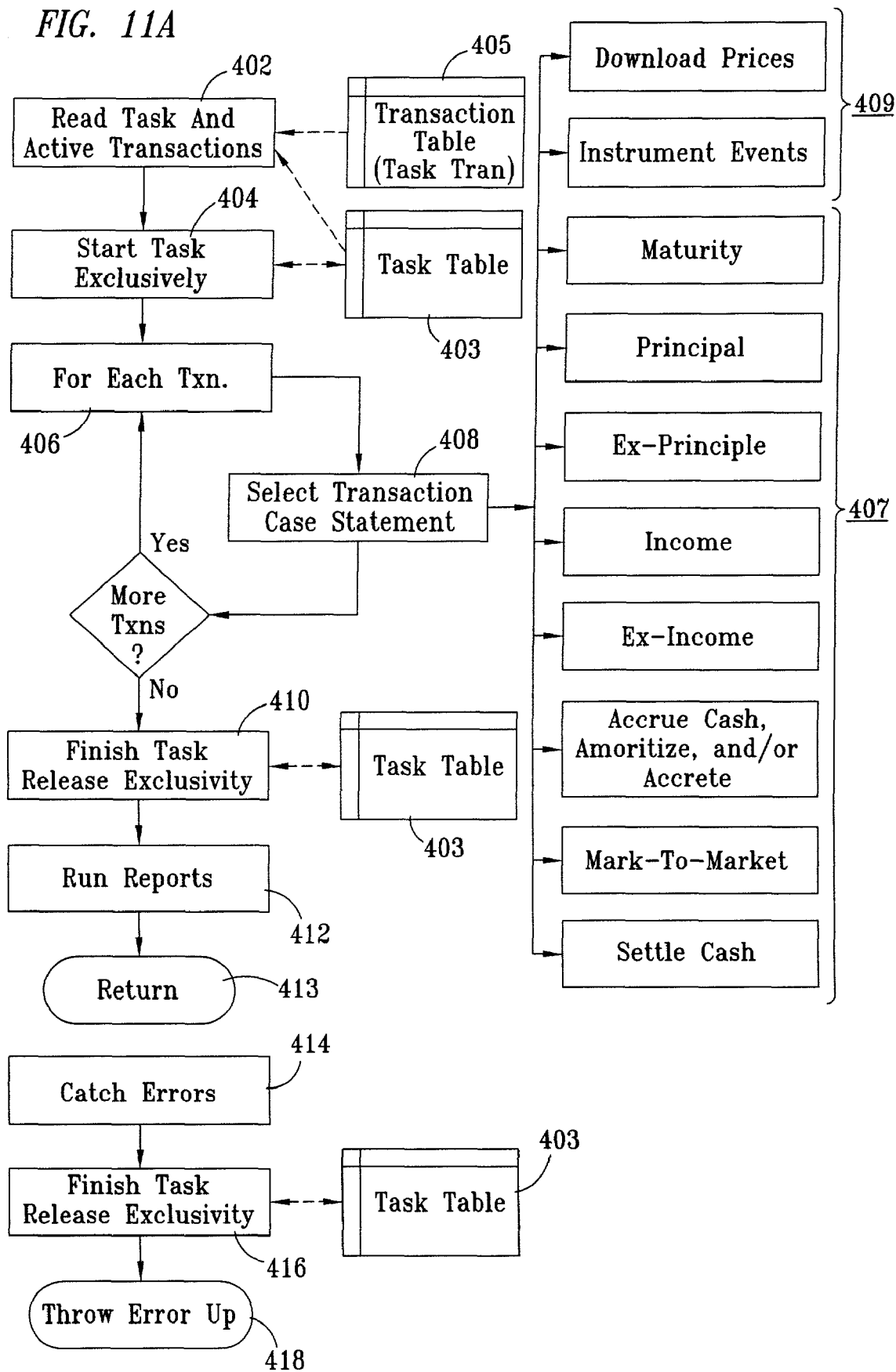
FIGS. 11A, 11B and 11C are process flow diagrams for the posting of the general nightly functions as a task, as a transaction and the transaction method for posting non-ticket transactions, respectively, in the preferred embodiment.
Figure 11B:
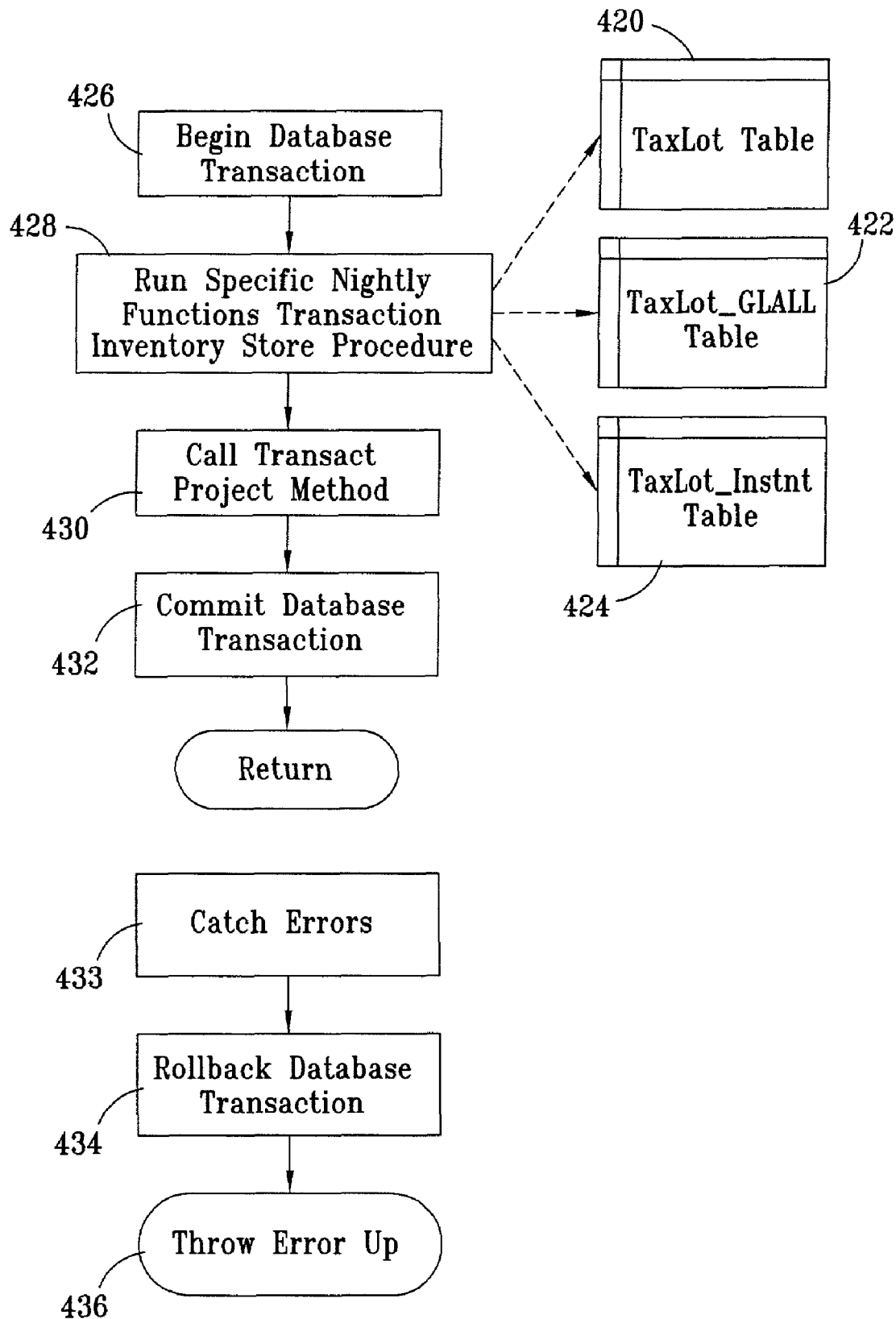

FIG. 11B depicts the general details of each box/transaction 407 in FIG. 11A, which are the only nightly function transactions that create ledger entries. The database transaction 407 is initiated at step 426. In step 428, a transaction-specific procedure is executed for summarizing the ledgers into three tables, namely, a TaxLot table 420, a TaxLot_glall table 422, and a TaxLot_instnt table 424. The TaxLot table 420 contains the list of open TaxLots. The TaxLot_GLALL table 422 contains the list of associated ledger account balances, showing all posted and unposted entries. The TaxLot_instnt table 424 contains the list of associated instruments. Next, in step 430, the project method (FIG. 11C below) is called for processing each of the TaxLots in the tables 420, 422, and 424 populated in step 428 to thereby project what event is coming in the near future. After all of the TaxLots have been successfully processed, in step 432 the results are committed to the database 54. In step 433, errors that occurred in steps 426-432 are trapped. Step 434 rolls back ("undoes") the database transaction that began at step 426; consequently, none of the data is posted to the ledger. In step 436, the error is thrown/raised to step 414 (FIG. 11A); i.e., the error is recorded in an error log or, if critical, the process is terminated.

Figure 11C:
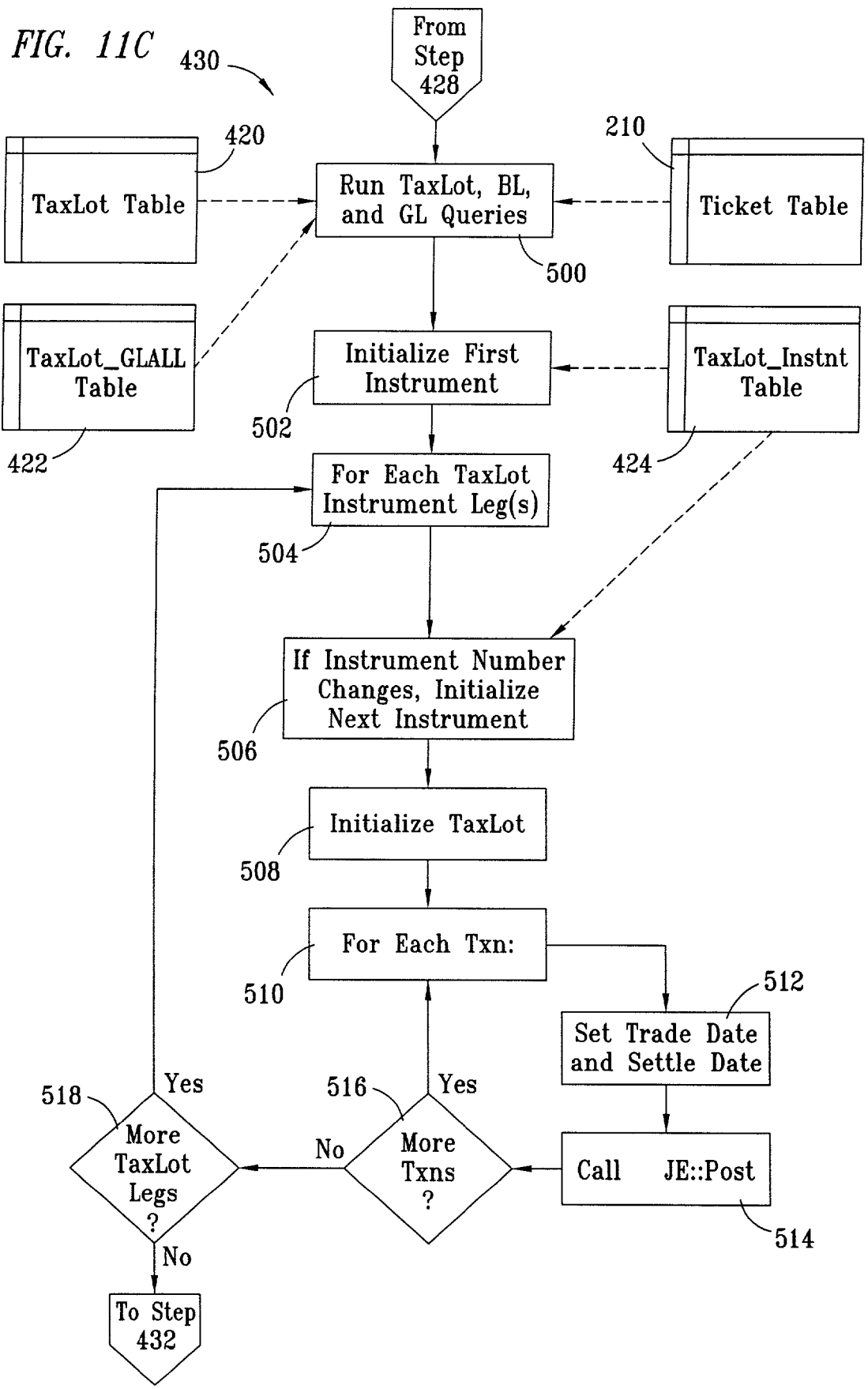

FIG. 11C is a flow diagram showing the details of step 430 (FIG. 11B). Upon completion of step 428 (FIG. 11B), the process of step 430 begins at step 500 by retrieving a list of the relevant TaxLots, identified in step 428. Next, the first instrument is initialized at step 502 and the instrument characteristics are determined from the TaxLot Instrument Table 424 (FIG. 11B). Then, for each instrument and instrument legs of the relevant TaxLots, the next instrument object is initialized at step 506, and the next TaxLot object is initialized at step 508 from the TaxLot Query recordset generated in step 500. For each transaction being processed at step 510, the trade and settlement date is set at step 512 and posted at step 514 to the ledgers, as discussed below with respect to FIGS. 12A and 12B. Upon completion of step 514, the process goes to step 516 in which a determination is made whether there are more transactions. If it is determined that there are more transactions, then the process returns to step 510; otherwise, the process goes to step 518 in which a determination is made whether there are more TaxLot legs. If it is determined that there are more TaxLot legs, then the process returns to step 504; otherwise, the process returns to 432 (FIG. 11B).

The loop starting at step 510 allows transactions, having the same inventory, to be processed together. For example, step 407 (FIG. 11A) processes Accrue Cash, Amortize, and Accrete all together because they run the same inventory store procedure at step 428 (FIG. 11B). If a transaction does not apply to the particular instrument being processed, step 602 (FIGS. 12A and 12B) will not find a JE template 64 and prematurely cancel the posting process.

FIGS. 12A and 12B are a flow diagram showing additional details of steps 246 (FIG. 9B), 326 (FIG. 10B), and 514 (FIG. 11C). FIGS. 12A and 12B outline the processes related to two specialized ledgers, namely, a general ledger 600 and a bank ledger 601 (FIG. 12B). The general ledger 600 is used to maintain a permanent centralized record of every activity affecting accounts, and is considered to be well-known in the art of accounting. The bank ledger 601 is used to post all transactions that affect bank balances, and is used for reconciliation against bank records.

Initially, the journal entry template array 64 is initialized at step 602. In step 603, a general ledger array containing two lines for each journal entry template line is created. One line contains the amount calculated for the ledger entry and the other line is to account for errors. The activity of each journal entry template line is then inserted into the Journal Entry Array 604 created table in steps 606-16. Specifically, in step 606, for each JE template line, the JE array is filled out. In step 608, the account number, currency, and original ticket are set. In step 610, the units, glAmt, and baseAmt are set. In step 611, allowance is made for an interruption of the entire process.

For example, a Mark-To-Market journal entry may be cancelled because the price is unavailable. If, in step 611, it is determined that the process should be cancelled, then the process returns to step 246 (FIG. 9B), 326 (FIG. 10B), or 514 (FIG. 11C), as appropriate. Otherwise, the process branches to step 612, wherein allowance is made for the use of an early completion flag in the journal entry template 64 to conditionally interrupt or complete processing. If the early completion condition is met, then the process branches to step 618. If the completion condition is not met, the journal entry line is flagged in step 614 as valid and, in step 616, a determination is made whether there are more journal entry lines for this JE template 64.

If, in step 616, it is determined that there are no more JE lines for the JE template (i.e., that the last line of a JE template has been processed in steps 606-14), then the process branches to step 618; otherwise, the process returns to step 606. In step 618, a determination is made whether a user has requested that like lines be combined or left expanded. If it is determined that like lines are to be combined, then the process goes to step 620; otherwise, the process branches to step 624. In step 620, like lines are summed and combined by currency, account, sub-account, original ticket and sub-instrument number. In step 622, lines with zero units, zero general ledger amounts and zero base amount are suppressed. In step 624, it is determined, if in the general ledger and base amounts, whether all credits and debits being posted sum to zero. If not, a determination is made as to what type of plug amount is necessary to make the credits and debits balance. In step 626, the number of general ledger lines involved with the journal entry is counted and lines related to bank ledger entries are flagged. In step 628, a determination is made whether there are valid general ledger lines. If it is determined that there are valid GL lines, then the general ledger lines are inserted into the general ledger table 600 at step 630. Those lines that are flagged for bank ledger entry are then entered into the bank ledger 601 at step 632. If, in step 628, it is not determined that there are valid GL lines, then the process returns to step 246 (FIG. 9B), 326 (FIG. 10B), or 514 (FIG. 11C), as appropriate.

Although specific embodiments of the present invention are described, they are not to be construed as limiting the scope of the present invention. The scope of the present invention is only limited by the claims appended hereto.

What is claimed is:

1. A data processing system for maintaining accounting records for a portfolio of investments, comprising:
   at least one computer readable medium operable to store software and a plurality of accounting records; and
   a processor that:
      executes the software stored on the at least one computer readable medium; and
      provides a template for generating an account entry to maintain an accounting record, the template based on a transaction type and an investment, wherein each line of the template designates which accounting record receives the account entry and at least one key designates a data source for the account entry and the key designates an operation on the data source to determine the amount of the account entry.

2. The data processing system of claim 1 further comprising a TaxLot designation for the transaction type involving the disposition of an investment.

3. The data processing system of claim 1 wherein the operation of the key is selected from the group of adding, subtracting, and multiplying by a factor.

4. A data processing system for maintaining accounting records for a portfolio of securities, comprising:

at least one computer readable medium operable to store software and a plurality of accounting records associated with one or more tax accounts; and a processor that:

executes the software stored on the at least one computer readable medium; and provides a template for generating an account entry to maintain an accounting record, the template based on a transaction and a security, wherein each line of the template designates which accounting record receives the account entry and a key designates a data source for the account entry and the key designates an operation on the data source to determine the amount of the account entry.

5. The data processing system of claim 4 further comprising a TaxLot designation for the transaction involving the disposition of an investment.

6. The data processing system of claim 4 wherein the operation of the key comprises at least one of adding, subtracting, and multiplying by a factor.

7. A data processing system for maintaining accounting records for a portfolio of securities, comprising:

at least one computer readable medium operable to store software, a plurality of accounting records associated with one or more tax accounts, and a plurality of defined security types; and a processor that:

executes the software stored on the at least one computer readable medium; and for each security type, provides a plurality of templates, each template based on one of a plurality of transaction types, for generating an account entry to maintain an accounting record, wherein each line of the template designates which accounting record receives the account entry and a key designates a data source for the account entry and the key designates an operation on the data source to determine the amount of the account entry.

8. The data processing system of claim 7 wherein the security types comprise at least one of stocks, bonds, futures, debt instruments, and options.

9. The data processing system of claim 7 further comprising the step of providing a TaxLot designation for each transaction type involving the disposition of an investment.

10. The data processing system of claim 7 wherein the operation of the key is selected from the group of adding, subtracting, multiplying by a factor.

* * * * *